United States Patent [19]
Petera

[11] Patent Number: 6,034,758
[45] Date of Patent: *Mar. 7, 2000

[54] LOW MULTIPLEX RATIO DOT MATRIX LIQUID CRYSTAL DISPLAY

[76] Inventor: Michael G. Petera, 1750 E. Jeanine Dr., Tempe, Ariz. 85284-3370

[ * ] Notice: This patent is subject to a terminal disclaimer.

[21] Appl. No.: 08/879,180

[22] Filed: Jun. 20, 1997

[51] Int. Cl.⁷ ........................ G02F 1/1343; G02F 1/1335
[52] U.S. Cl. ............................................. 349/143; 349/103
[58] Field of Search ............................. 349/143; 345/103

[56] References Cited

U.S. PATENT DOCUMENTS 5,585,948  12/1996  Petera ........................................ 349/143

*Primary Examiner*—William L. Sikes
*Assistant Examiner*—Joanne Kim
*Attorney, Agent, or Firm*—John D. Titus

[57] ABSTRACT

A passive dot matrix liquid crystal display having improved visibility comprises plural column electrodes on a first plate interconnected by a plurality of electrode bridges to form groups of interconnected column electrodes, wherein the number of electrodes in each electrode group is equal to or less than the inverse of the multiplex ratio of the display. The display also comprises plural row electrodes interconnected by a plurality of electrode bridges to form groups of interconnected row electrodes, wherein the number of groups of interconnected row electrodes is equal to the multiplex ratio of the display. By grouping the row and column electrodes into such groups, the multiplex ratio of the display can be reduced to levels substantially below the multiplex ratios of conventional passive dot matrix Liquid Crystal Displays, thereby significantly enhancing visibility of the display.

6 Claims, 8 Drawing Sheets

LOW MULTIPLEX RATIO DOT MATRIX LIQUID CRYSTAL DISPLAY

This invention relates to a liquid crystal display.

More particularly, the invention relates to a dot matrix liquid crystal display having a low multiplex ratio.

Dot matrix liquid crystal displays (LCDs) are well known in the art. In a conventional multiplex-addressed passive dot matrix display, the electrode pairs that are used to activate the liquid crystal material are formed by column electrodes on one electrode plate and row electrodes on an opposing electrode plate. Each column electrode is electrically interconnected with the remaining electrodes in the column. Similarly, each row electrode is electrically interconnected with the remaining electrodes in the row. In order to address a single electrode pair, the row and column corresponding to the desired electrode pair must be activated, without activating any other column or row. Thus, in order for such a display to produce a character, each row of electrodes be separately addressed to produce the appropriate pixels. The multiplex ratio of such a display is equal to the number of rows of electrodes because each row of electrodes must be addressed seriatim in a single time cycle.

To prevent a pixel at a previously addressed electrode pair from "fading" while subsequent electrode pairs are addressed, it is possible to utilize liquid crystal materials having a slow response time. Use of slow responding fluids, however, has an adverse effect on the response time of the display. Moreover, even with slow responding fluids, as the previously addressed pixels "fade" the contrast ratio deteriorates.

A second problem inherent in conventional passive multiplex-addressed displays is that capacitive coupling will cause non-selected electrode pairs to switch to an intermediate gray level. To prevent the switching of non-selected electrode pairs, an intermediate voltage is applied to all non-selected rows and columns. The intermediate voltage necessary to prevent capacitive illumination is a function of the number of rows of electrodes—the more rows of electrodes, the smaller the difference between the select and non-select voltage. Accordingly as the number of rows increase, the contrast ratio that can be obtained with a given liquid crystal material decreases.

Accordingly, it would be highly desirable to provide an improved liquid crystal display which would have a low multiplex ratio and provide high contrast.

Therefore, it is a principal object of the invention to provide an improved liquid crystal display.

A further object of the invention is to provide an improved dot matrix liquid display which has a low multiplex ratio and has high contrast.

These and other, further and more specific objects and advantages of the invention will be apparent to those skilled in the art from the following detailed description thereof, taken in conjunction with the drawing figures, in which.

Figure 7:
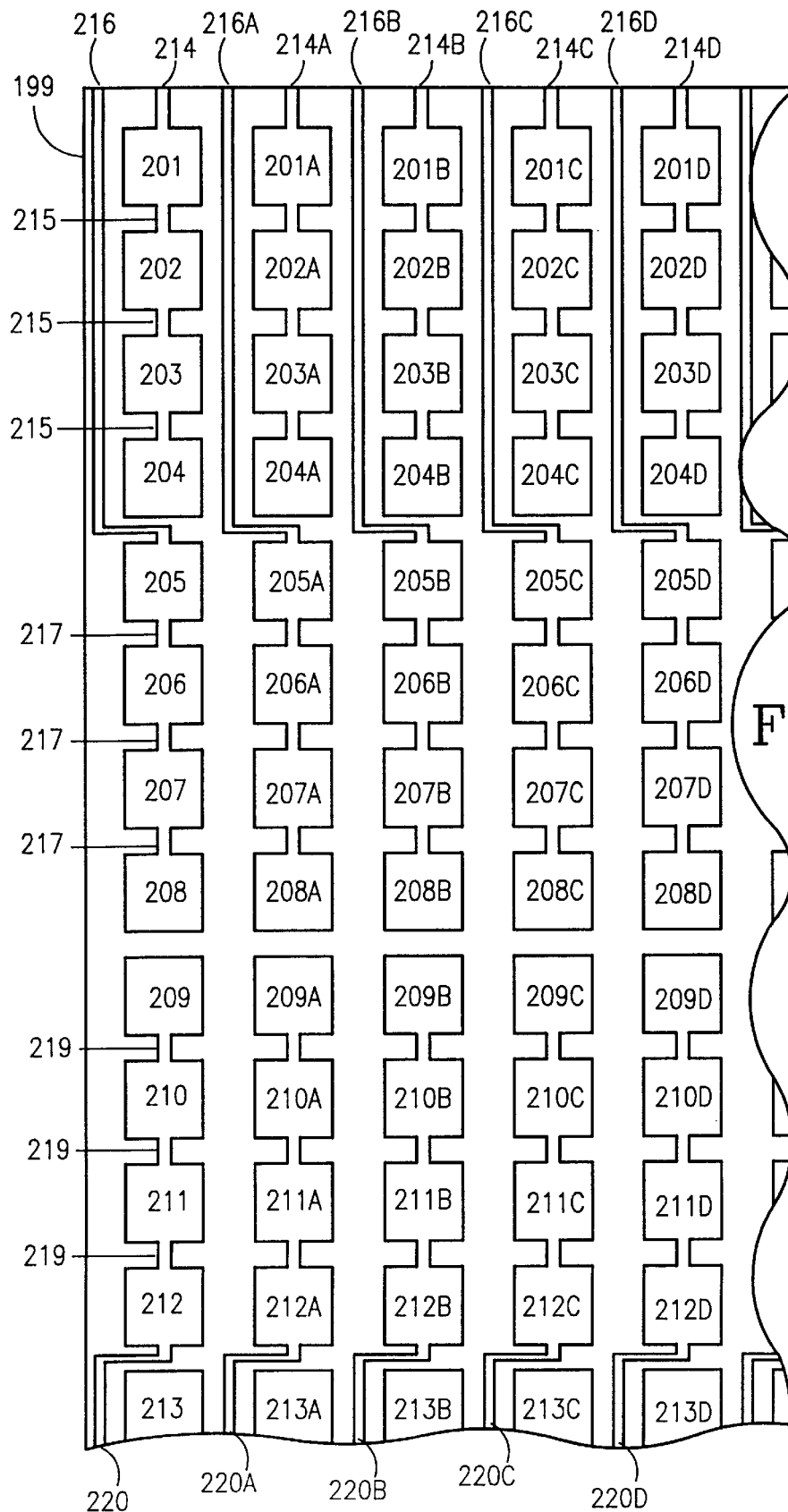
Figure 8:
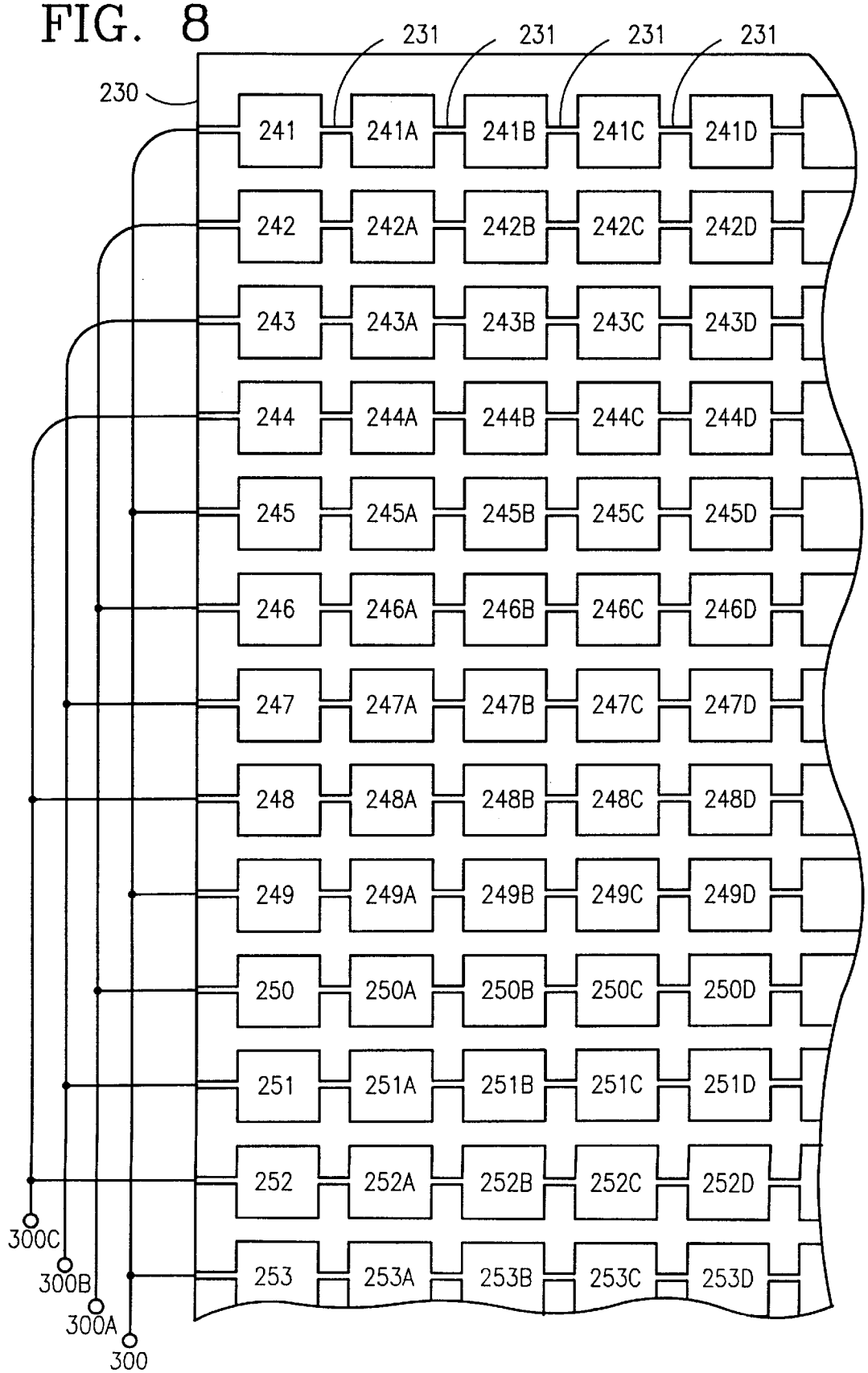

FIG. 7 is a top view of the face of one of the glass plates of an LCD assembly adapted for 1/4 mux operation illustrating transparent conductive electrodes, bridges, and leads formed on the glass plate; and FIG. 8 is a top view of the face of the other of the glass plates of the 1/4 mux LCD assembly of FIG. 7 illustrating transparent conductive electrodes, bridges, and leads formed on the glass plate.

Briefly, in accordance with our invention, there is provided an improved dot matrix liquid crystal display assembly adapted to be driven at 1/2, 1/3, or 1/4 mux. The assembly includes a first electrode plate having a face and a back; a plurality of spaced apart main electrodes on the face of the plate defining a matrix of electrodes comprising at least two columns and at least five rows of electrodes; a plurality of bridges on the face of the plate electrically interconnecting a number of the electrodes to form groups of interconnected electrodes, wherein the number of electrodes in each group is no greater than the inverse of the multiplex ratio; a plurality of electrically conductive leads on the face of the plate each connected to one of the groups of electrodes interconnected by the bridges; a second electrode plate having a face and a back, the face of the second plate being spaced apart from and opposed to the face of the first plate; a layer of liquid crystal material intermediate the face of the first plate and the face of the second plate; a plurality of spaced apart row electrodes on the face of the second plate, each of the row electrodes being spaced apart from, opposed to, and aligned with one of the electrodes on the first plate; a plurality of electrically conductive bridges on the face of the second plate interconnecting the row of electrodes in each row; a plurality of electrically conductive leads interconnecting a plurality of the rows of interconnected row electrodes to form groups of interconnected row electrodes, wherein the number of groups of interconnected row electrodes is equal to the inverse of the multiplex ratio. The foregoing assembly permits each electrode pair triad or quad to be independently addressed, but at a much lower multiplex ratio than is possible in a conventional multiplex-addressed dot matrix LCD, thereby producing a much higher contrast ratio than is possible with the prior art devices.

Figure 1:
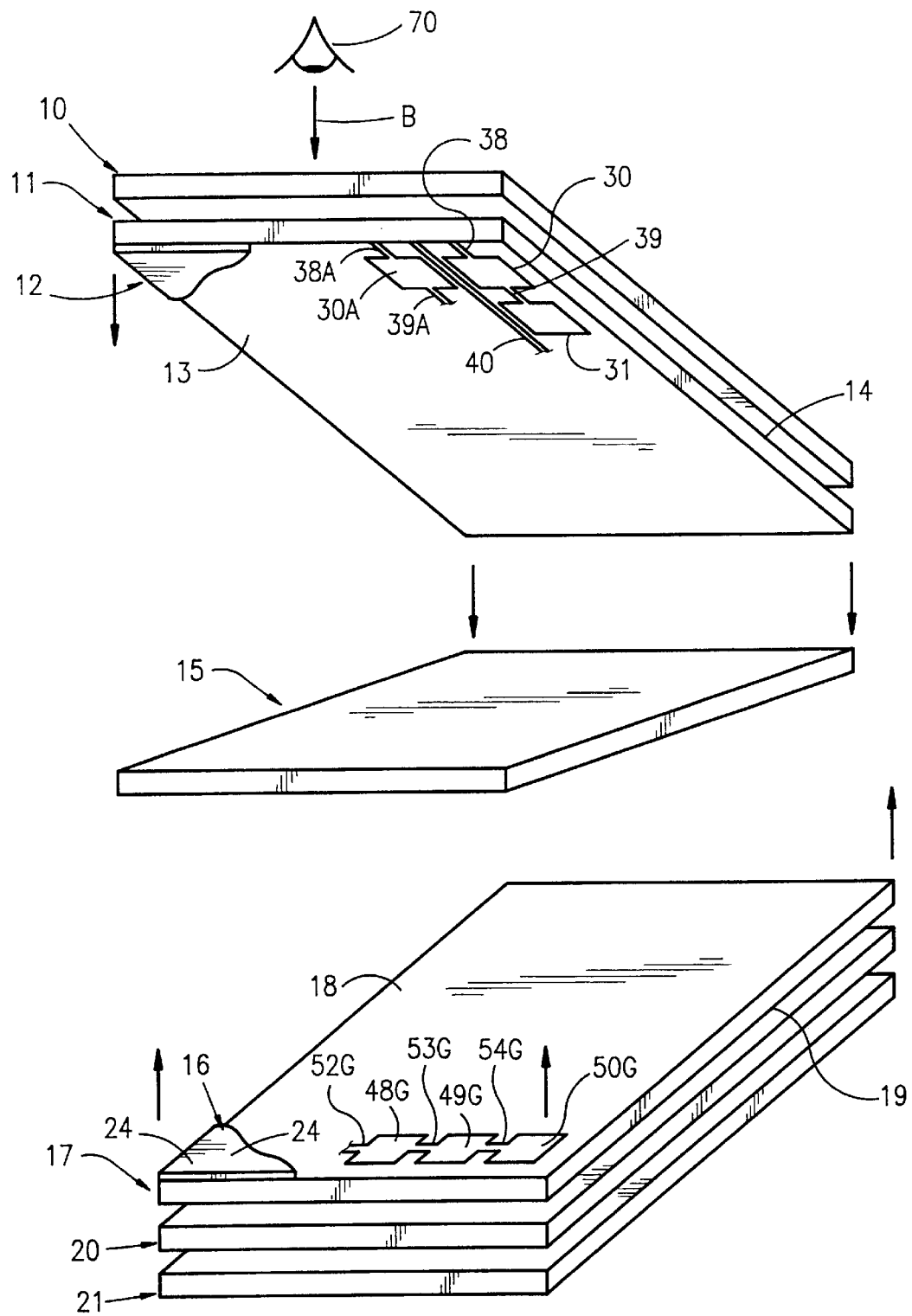
FIG. 1 is an exploded perspective view illustrating a LCD assembly constructed in accordance with the principles of the invention.

Turning now to the drawings, which describe the presently preferred embodiment of the invention for the purpose of illustrating the practice thereof and not by way of limitation of the scope of the invention, and in which like reference characters illustrate corresponding elements throughout the several views, FIG. 1 is an exploded assembly view of an LCD display or assembly constructed in accordance with the principles of the invention and generally including a polarizer 10, a glass plate 11 having transparent conductive electrodes, bridges, and leads which may have an alignment layer 12, a layer 15 of liquid crystal material (including either thermotropic liquid crystals and/or lyotropic liquid crystals as desired) including either thermotropic liquid, a glass plate 17 having transparent conductive electrodes and leads which may be coated with an alignment layer 16, spacers 24 (typically small glass or plastic spheres) for maintaining alignment layers 12, 16 and plates 11, 17 a selected distance apart, a polarizer 20, and a reflective layer, for example a mirror, 21. As would be appreciated by those of skill in the art, polarizer 20 can be transmissive or, if mirror 21 is half-silvered, can be transflective and various other polarizer and/or mirror combinations can be utilized in the LCD assembly. Further, LCD assemblies which do not require polarizers and/or reflective or transreflective layers are well known in the art. Plates 11, 17 can be formed from glass, plastic, or any other desired electrically non-conductive material. By way of example, the electrodes, bridges, and leads can be formed from a metal alloy such as indium-tin oxide; layers 12 and 16 can be formed from polyamide; and, layer 15 can be a twisted nematic liquid crystal. The LCD display of FIG. 1 is driven at a multiplex ratio of 1/2. As would be appreciated by those of skill in the art, the dot matrix LCD display of FIG. 1 ordinarily is used to form a single alphanumeric or other character, and, in normal commercial use a plurality of the LCD assemblies of FIG. 1 are utilized side-by-side so that a plurality of alphanumeric or other characters can be displayed simultaneously, as in, for example, a watch.

Figure 2:
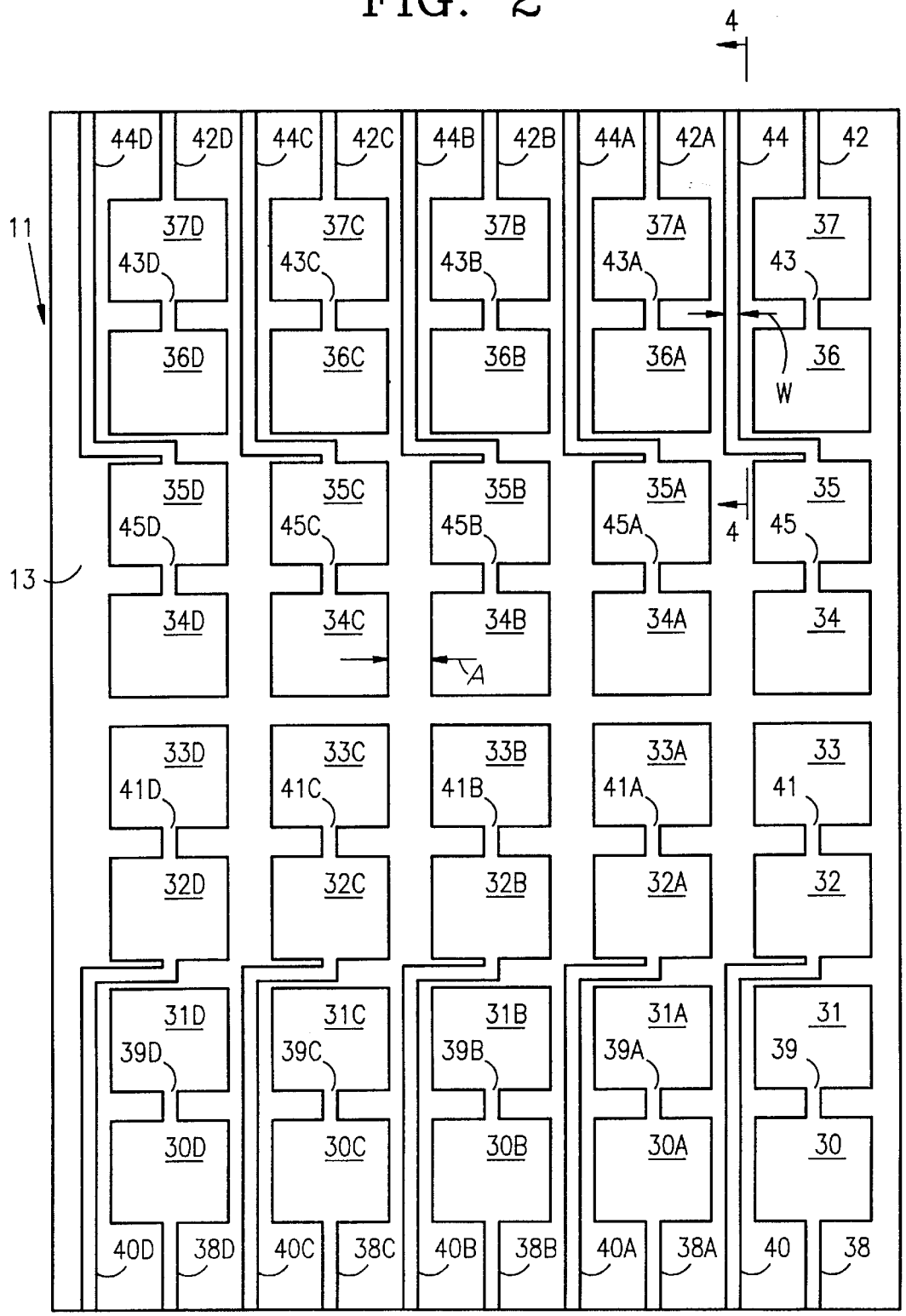
FIG. 2 is a top view of the face of one of the glass plates of the LCD assembly of FIG. 1 illustrating transparent conductive electrodes, bridges, and leads formed on the glass plate.

In FIG. 1, only a portion of the transparent conductive leads, bridges, and column electrodes formed on the face 13 of glass plate 11 are shown for the sake of clarity. FIG. 2 illustrates in detail each of the leads, bridges, and electrodes which are formed of thin, substantially transparent layers on the face 13. The leads, bridges, and electrodes can be formed from any desired electrically conductive material. The electrodes must be formed from substantially transparent material; the leads and bridges need not be formed from substantially transparent material. The first column of electrodes on face 13 includes electrodes 30 to 37; the second column of electrodes on face 13 includes electrodes 30A to 37A; the third column of electrodes includes electrodes 30B to 37B; the fourth column includes electrodes 30C to 37C; and, the fifth column includes electrodes 30D to 37D. In the illustrative embodiment of FIG. 1, each electrode comprises a thin square-shaped ITO layer on surface 13.

Electrodes 30 and 31 are interconnected by bridge 39; electrodes 30A and 31A are interconnected by bridge 39A; electrodes 30B and 31B are interconnected by bridge 39B; electrodes 30C and 31C are interconnected by bridge 39C; and, electrodes 30D and 31D are interconnected by bridge 39D.

Electrodes 32 and 33 are interconnected by bridge 41; electrodes 32A and 33A are interconnected by bridge 41A; electrodes 32B and 33B are interconnected by bridge 41B; electrodes 32C and 33C are interconnected by bridge 4IC; and, electrodes 32D and 33D are interconnected by bridge 41D.

Electrodes 34 and 35 are interconnected by bridge 45; electrodes 34A and 35A are interconnected by bridge 45A; electrodes 34B and 35B and interconnected by bridge 45B; electrodes 34C and 35C are interconnected by bridge 45C; and, electrodes 34D and 35D are interconnected by bridge 45D.

Electrodes 36 and 37 are interconnected by bridge 43; electrodes 36A and 37A are interconnected by bridge 43A; electrodes 36B and 37B are interconnected by bridge 43B; electrodes 36C and 37C are interconnected by bridge 43C; and, electrodes 36D and 37D are interconnected by bridge 44D.

Leads 38, 38A, 38B, 38C, 38D are connected to electrodes 30, 30A, 30B, 30C, 30D, respectively. Leads 40, 40A, 40B, 40C, 40D are connected to electrodes 32, 32A, 32B, 32C, 32D, respectively. Leads 42, 42A, 42B, 42C, 42D are connected to electrodes 37, 37A, 37B, 37C, 37D, respectively. Leads 44, 44A, 44B, 44C, 44D are connected to electrodes 35, 35A, 35B, 35C, 35D, respectively.

The distance, indicated by arrows A in FIG. 2, between each adjacent column of electrodes is presently typically about 3 mils, but can vary as desired.

Figure 3:
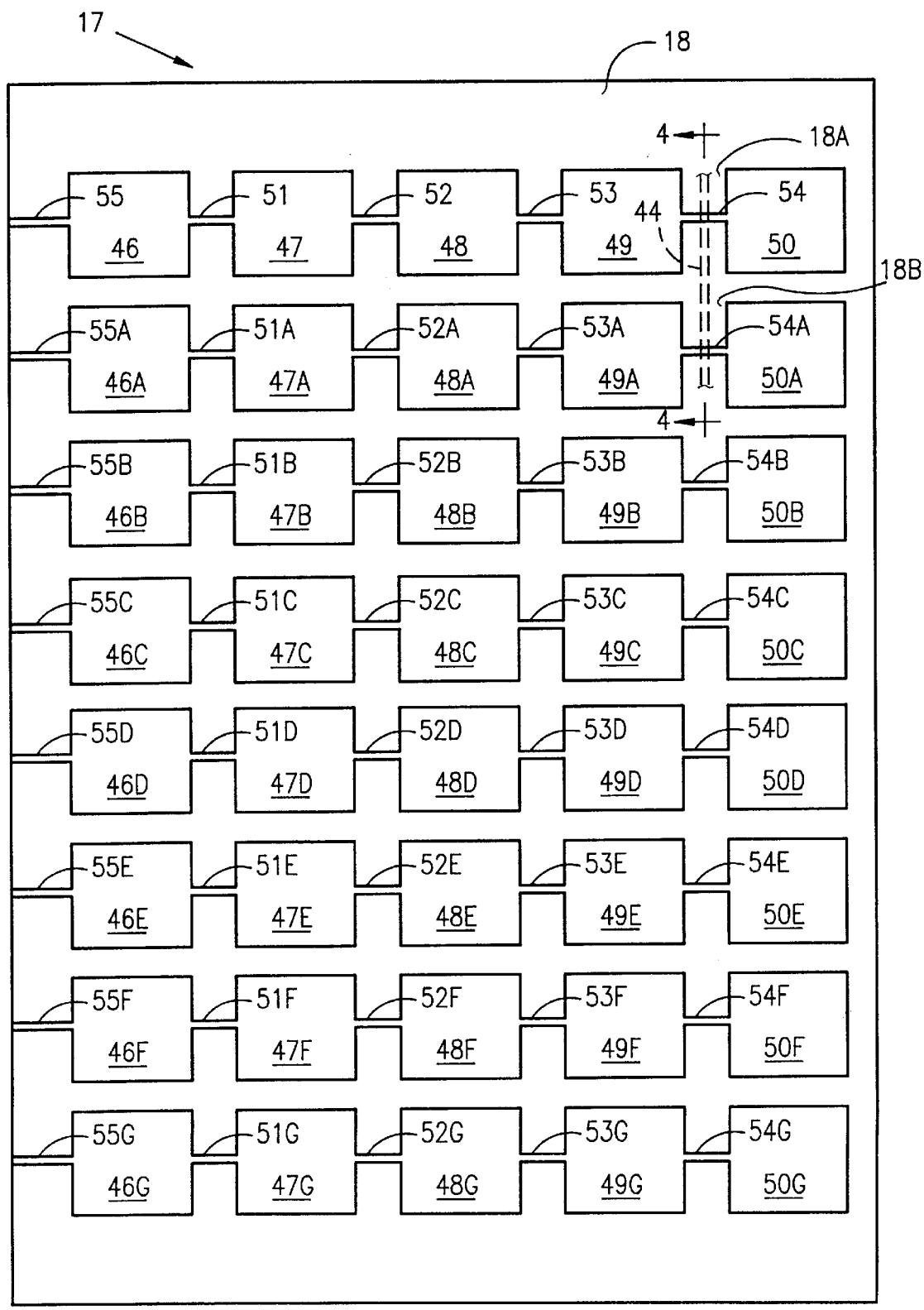
FIG. 3 is a top view of the face of the other of the glass plates of the LCD assembly of FIG. 1 illustrating transparent conductive electrodes, bridges, and leads formed on the glass plate.

In FIG. 1, only a portion of the ITO leads, bridges, and row electrodes formed on the face 18 of glass plate 17 are shown for the sake of clarity. FIG. 3 illustrates each of the leads, bridges, and electrodes which 25 are formed of thin, substantially transparent ITO layers on the face 18. The leads, bridges, and electrodes can be formed from any desired electrically conductive material. The electrodes must be formed from substantially transparent material; the leads and bridges need not be formed from substantially transparent material. Each electrode in the illustrative embodiment comprises a square-shaped ITO layer on surface 13. The shape, contour, and dimension of each electrode, lead, and bridge on a face 13, 18 can vary as desired. The first row of electrodes includes electrodes 46 to 50; the second row includes electrodes 46A to 50A; the third row includes electrodes 46B to 50B; the third row includes electrodes 46C to 50C; the fourth row includes electrodes 46D to 50D; the fifth row includes electrodes 47E to 50E; the sixth row includes electrodes 47F to 50F; and, the eighth row includes electrodes 46F to 50G.

Bridge 51 interconnects electrodes 46 and 47; bridge 51A interconnects electrodes 46A and 47A; bridge 51B interconnects electrodes 46B and 47B; bridge 51C interconnects electrodes 46C and 47C; bridge 51D interconnects electrodes 46D and 47D; bridge 51E interconnects electrodes 46E and 47E; bridge 51F interconnects electrodes 46F and 47F; and, bridge 51G interconnects electrodes 46F and 47G.

Bridge 52 interconnects electrodes 47 and 48; bridge 52A interconnects electrodes 47A and 48A; bridge 52B interconnects electrodes 47B and 48B; bridge 52C interconnects electrodes 47C and 48C; bridge 52D interconnects electrodes 47D and 48D; bridge 52E interconnects electrodes 47E and 48E; bridge 52F interconnects electrodes 47F and 48F; and, bridge 52G interconnects electrodes 47G and 48G.

Bridge 53 interconnects electrodes 48 and 49; bridge 53A interconnects electrodes 48A and 49A; bridge 53B interconnects electrodes 48B and 49B; bridge 53C interconnects electrodes 48C and 49C; bridge 53D interconnects electrodes 48D and 49D; bridge 53E interconnects electrodes 48E and 49E; bridge 53F interconnects electrodes 48F and 49F; and, bridge 53G interconnects electrodes 48G and 49G.

Bridge 54 interconnects electrodes 49 and 50; bridge 54A interconnects electrodes 49A and 40A; bridge 54B interconnects electrodes 49B and 50B; bridge 54C interconnects electrodes 49C and 50C; bridge 54D interconnects electrodes 49D and 50D; bridge 54E interconnects electrodes 49E and 50E; bridge 54F interconnects electrodes 49F and 50F; and, bridge 54G interconnects electrodes 49G and 50G.

Electrode lead 55 connects to electrode 46; lead 55A connects to electrode 46A; lead 55B connects to electrode 46B; lead 55C connects to electrode 46C; lead 55D connects to electrode 46D; lead 55E connects to electrode 46E; lead 55F connects to electrode 46F; and, lead 55G connects to electrode 46G.

When the electrode unit of FIG. 1 is assembled, each square electrode on face 13 is directly opposed to, aligned with, and spaced apart from a square electrode on face 18 to form a stacked electrode pair. Forty (40) such electrode pairs are formed. A portion of the liquid crystal layer 15 is sandwiched between and intermediate each such stacked electrode pair. The forty opposing stacked electrode pairs include stacked electrode pairs 50-37, 49-37A, 48-37B, 47-37C, 46-37D, 50A-36, 49A-36A, 48A-36B, 47A36C, 46A-36D, 50B-35, 49B-35A, 48B-35B, 47B-35C, 46B-35D, 50C-34, 49C-34A, 48C-34B, 47C-34C, 46C-34D, 50D-33, 49D-33A, 48D-33B, 47D-33C, 46D-33D, 50E-32, 49E-32A, 48E-32B, 47E-32C, 46E-32D, 50F-31, 49F-31A, 48F-3B, 47F-31C, 46F-31D, 50G-30, 49G-30A, 48G-301B, 47G-30C, and 46G-30D. As is well known in the art, the shape and dimension of each electrode can be varied as desired, as can the number of electrodes and electrode pairs (i.e., the stacked electrode pairs) and the number of columns and rows in the dot matrix display.

In the illustrative embodiment, each lead 40 to 40D and 44 to 44D preferably has a width of about one mil when it passes between a pair of adjacent electrodes. For example, the portion of lead 44 passing intermediate electrodes 37A and 37 has a width, indicated by arrows W in FIG. 2, of about one mil, leaving a space of about one mil between lead 44 and either electrode 37 or 37A.

As earlier noted, the electrodes, leads, and bridges on face 13 do not touch or contact the electrodes, leads, and bridges on face 18 because faces 13 and 18 are spaced apart by spacers 24. Further, when used, polyamide layers 12 and 16 cover the electrodes, bridges, and leads on each face 13 and 18. After, however, the mirror or other reflective surface 21, polarizers 10 and 20, plates 11 and 17 and liquid crystal layer 15 are sandwiched together in conventional fashion, each lead 44 to 44D and 40 to 40D (when viewed from above in the direction indicated by arrow B in FIG. 1) is seen to cross over certain of the bridges or leads at points intermediate adjacent pairs of electrodes. In particular, lead 44 crosses over bridges 54 and 54A; lead 44A crosses over bridges 53 and 53A; lead 44B crosses over bridges 52 and 52A; lead 44C crosses over bridges 51 and 51A; lead 44D crosses over leads 55 and 55A; lead 40D crosses over leads 55F and 55G; lead 40C crosses over bridges 51F and 51G; lead 40B crosses over bridges 52F and 52G; lead 40A crosses over bridges 53F and 53G; and lead 40 crosses over bridges 54F and 54G.

Figure 4:
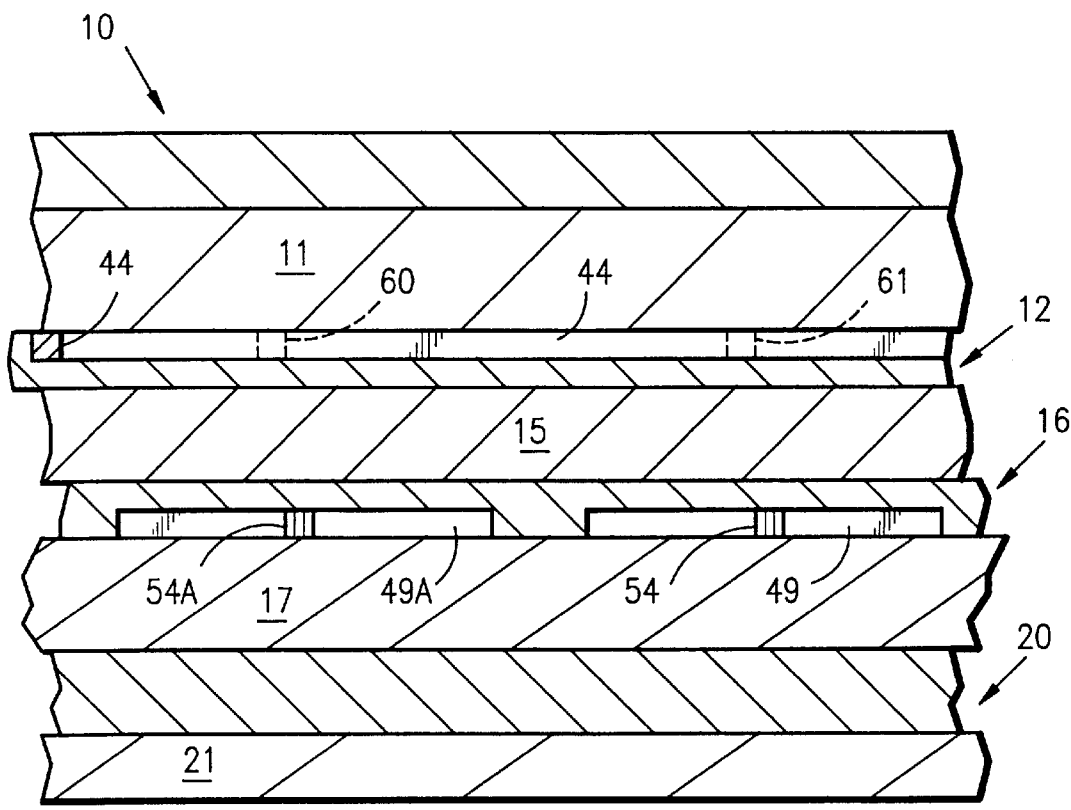
FIG. 4 is a section view of LCD assembly of FIG. 1 taken along section lines 4—4 in FIGS. 2 and 3 and illustrating further construction details thereof.

In FIG. 4, lead 44 is directly above and passes over the midpoints of bridges 54 and 54A in the manner indicated by dashed lines 44 in FIG. 3; i.e., lead 44 passes over and above the areas 18A and 18B of surface 18 which are intermediate each pair of adjacent electrodes 49–50 and 49A–50A. Since in the illustrative embodiment, which comprises a display element less than about 2 cm in height, intended to be viewed at a distance at about 1 foot, bridges 54 and 54A and lead 44 are each one mil wide, the "cross over" portions 60 and 61 of lead 44 which are directly above the mid-portion of bridges 54 and 54A in FIG. 1 are square. Each square "cross over" portion 60 and 61 has four edges each about 1 mil long. Consequently, the cross-sectional area of each portion 60 and 61 seen when viewed in the direction of arrow B in FIG. 1 is 1 square mil. Maintaining the cross-sectional area of each "cross over" portion 60, 61 of lead 44 at a size of 1 square mil or less where the character size of the dot-matrix is less than 2 cm high reduces the likelihood that portions 60 and 61 will, if activated, produce sufficient "cross over illumination" to be perceptible to the user. The cross-sectional area of each, "cross over", portion 60, 61 of lead 44 can be as large or as small as desired, however, it is preferred that the size of such cross-sectional areas be sufficiently small to not be readily visible by the eye from normal viewing distances of approximately twelve to eighteen inches. The shape and dimension of each "cross over" portion can vary as desired. For larger displays intended to be viewed from a distance, the "cross over" area may be larger, proportional to the size of the electrodes comprising the dot matrix. In general, to be visually imperceptible, the size of the "cross over" area must be such that it subtends an angle of less than two arc-seconds, preferably less than 1 arc-second.

If desired, black or other opaque matrix color material may be deposited over bridges 54, 54A, etc. to mask cross over illumination; for example, black material may be deposited in the polyamide layer as a part of the polyamide layer over bridges 54, 54A. In practice, it is presently preferred that each lead 44 be spaced at least 1 mil apart from any electrode 36, 36A, 37, 37A adjacent the lead. The purpose of the spacing between the electrodes 36, 36A, etc. and adjacent leads 44, etc. is to prevent shorts between the electrodes and leads. The relative proportions of the various components of the LCD assembly as shown in FIG. 4 are not accurate. The proportions shown in FIG. 4 were selected to facilitate the explanation of how the LCD assembly of the invention functions.

The operation of the 1/2 mux (1/2 multiplex ratio) LCD display of FIGS. 1 to 4 is illustrated by describing how the display is operated to form the numeral one. While the voltage differential between the electrodes on face 18 and the electrodes on face 13 can vary as desired, it is assumed in this example that the AC or DC voltage differential is about five volts in order to activate the liquid crystal material between each stacked electrode pair. As is well known, it is presently preferred that an AC voltage differential be utilized. The polarity of the voltage in the electrodes on face 13 differs from the polarity of the voltage in the electrodes on face 18. If the polarity of all of the electrodes on face 13 is positive, then the polarity of all of the electrodes on face 18 is negative. During each cycle, the polarity of the activated electrodes on a face 13, 18 is changed. During each cycle, the electrodes on a face 13, 18 are activated by applying a voltage to obtain the required five volt differential between selected ones of the forty opposing stacked electrode pairs 50-37, 49-37A, 48-37B, 47-37C, 46-37D, 50A-36, 49A-36A, 48A-36B, 47A-36C, etc. The voltage differential required to drive 1/2, 1/3, 1/4 or greater multiplex ratios is well known to those skilled in the art.

To produce the numeral one on the LCD display of FIG. 1, during the first time cycle leads 55A, 55C, 55E, and 55G are activated simultaneously with leads 38, 38A, 38B, 38C, 38D, 40B, 44B, 42B, and 42C. This activates the opposing electrode pairs 30-50G, 30A-49G, 30B-48G, 30C-47G, 30D-46G, 32B-48E, 34B-48C, 36B-48A, and 36C-47A. When the electrode pairs are activated, the twisted nematic liquid crystals in layer 15 align toward the charges on the electrodes which, depending on the type and orientation of polarizers 10 and 20 utilized, causes light to travel outwardly through the electrode on face 13 and through polarizer 10 toward the eye 70 of the view or causes the electrode area on face 13 to appear black when viewed by eye 70 "through" polarizer 10. During the second time cycle, all of the leads activated during the first time cycle are deactivated, and leads 55, 55B, 55D, 55F are activated simultaneously with leads 42B, 44B, 40B and 38B. This activates the opposing electrode pairs 31B-48F, 33B-48D, 35B-48B, 37B-48. After the second time cycle is completed, then all of the leads activated during the second time cycle are deactivated, the first time cycle is repeated, then the second, then the first, etc. Each time cycle lasts only a short period of time, typically twenty milliseconds or less. Voltage applied to selected stacked electrode pairs during the time interval of the first cycle can continue to be applied for a small fraction of time at the beginning of the time interval during which voltage is applied to selected stacked electrode pairs during the second cycle. This small overlap of the simultaneous application of voltage during the first and second cycles does not, however, alter the basic function of an LCD of the invention in applying voltage only to selected stacked electrode pairs during the first cycle and in then applying voltage only to selected other stacked electrode pairs during the second cycle.

Figure 5:
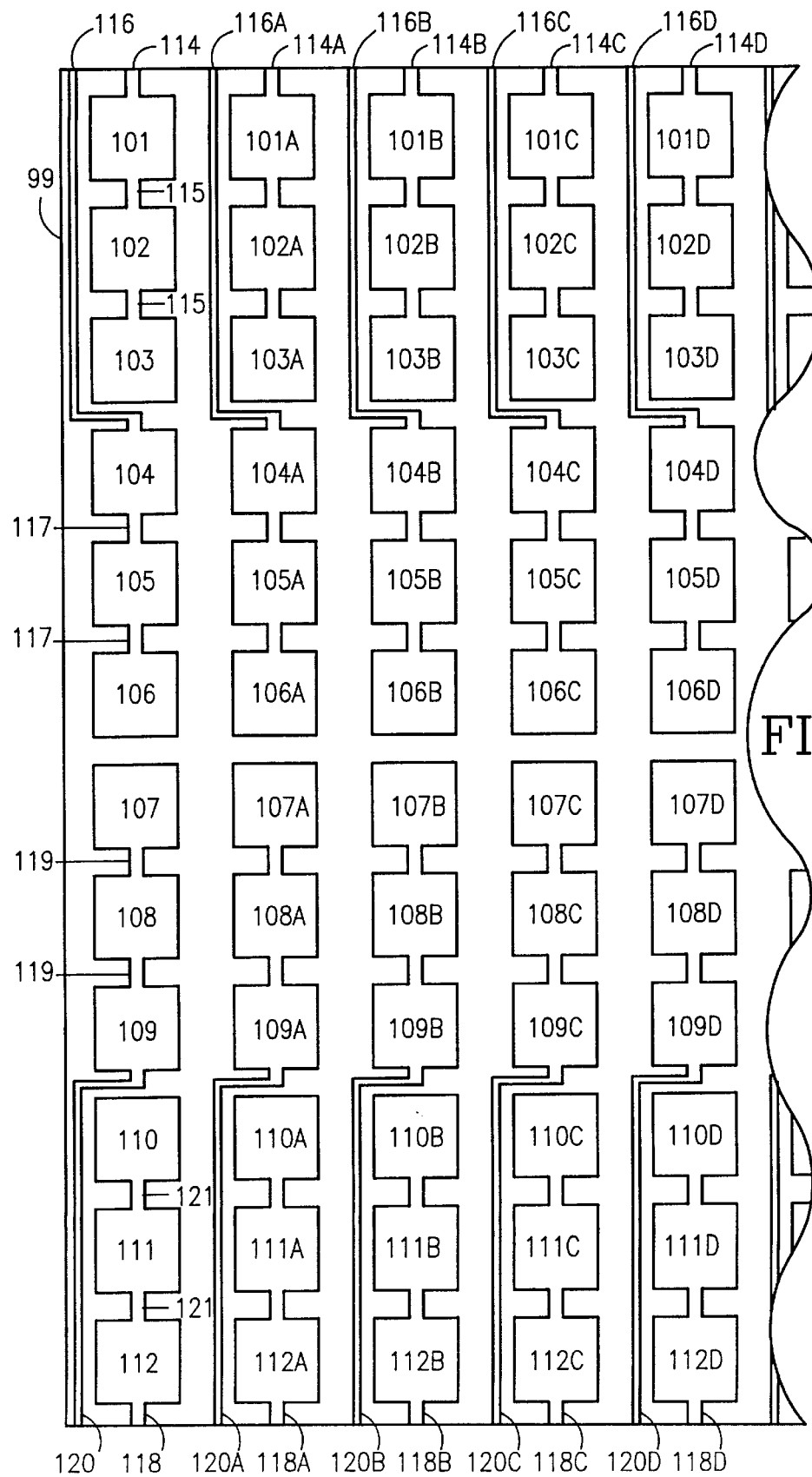
FIG. 5 is a top view of the face of one of the glass plates of an LCD assembly adapted for 1/3 mux operation illustrating transparent conductive electrodes, bridges, and leads formed on the glass plate.
Figure 6:
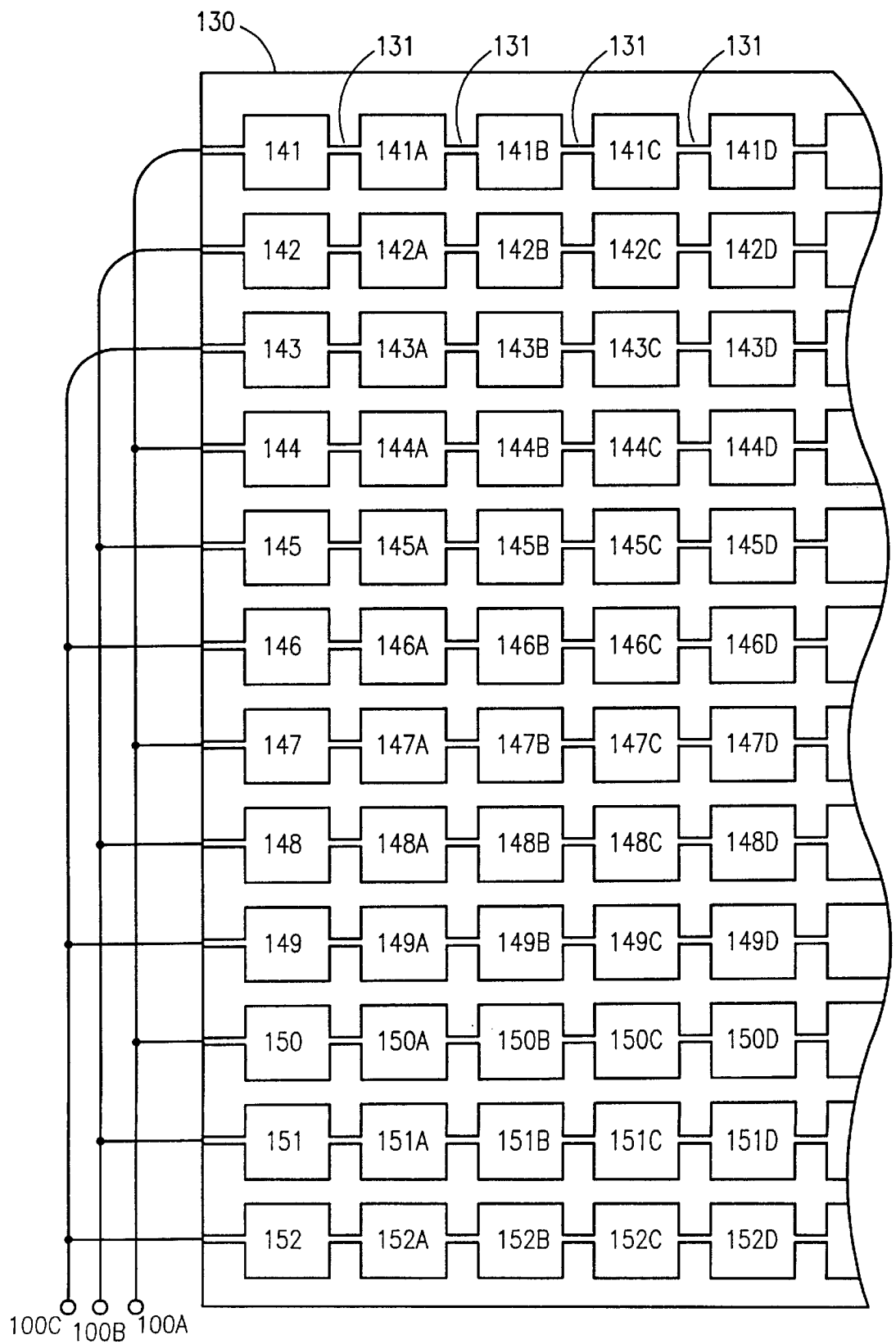
FIG. 6 is a top view of the face of the other of the glass plates of the 1/3 mux LCD assembly of FIG. 5 illustrating transparent conductive electrodes, bridges, and leads formed on the glass plate.

As would be appreciated by those of skill in the art, appropriate lead—bridge—electrode configurations can be produced which will produce an LCD display having a 1/3 or 1/4 multiplex ratio instead of the 1/2 multiplex ratio of the LCD display of FIGS. 1 to 4. FIG. 5 is a top view of a primary electrode plate 99 for use in an LCD display adapted to be driven at a 1/3 multiplex ratio. The illustrative electrode plate 99 comprises 12 rows and at least 6 columns of electrodes. FIG. 6 is a top view of a corresponding back plane electrode plate 130. Referring to FIG. 5, electrodes 101, 102, and 103 are electrically interconnected by bridges 115 to form an electrode triad. Electrodes 104, 105, and 106 are electrically interconnected by bridges 117. Electrodes 107, 108, and 109 are electrically interconnected by bridges 119. Electrodes 110, 111, and 112 are electrically interconnected by bridges 121. The remaining electrodes 101A–112D are similarly interconnected to form electrode triads.

Referring to FIG. 6, back plane electrodes 141, 141A, 141B, 141C and 141D are interconnected by bridges 131 to form a single row of interconnected back plane electrodes. Back plane electrodes 142–152D are similarly interconnected to form a plurality of single rows of interconnected back plane electrodes. Leads 100A, 100B and 100C are alternatingly interconnected to every third row of interconnected back plane electrodes 141–152D.

Primary electrode plate 99 is positioned above back plane electrode plate 130 with a liquid crystal material disposed between the two electrode plates as hereinbefore described, to form 60 (shown) electrode pairs 101-141, 101A-141A 101B-141B, 101C-141C, 101D-141D, 102-142, 102A-142A, etc. As with the 1/2 mux embodiment of FIGS. 1–4, each electrode pair in the embodiment of FIGS. 5–6 is separately addressable during one complete time cycle, however, unlike the 1/2 mux embodiment, the time cycle of the embodiment of FIGS. 5–6 that three phases rather than two.

By way of example to demonstrate the operation in 1/3 mux, to produce a pair of intersecting diagonal lines, during the first part of the time cycle, back plane lead 100A is activated along with primary leads 114, 116C, 118, and 120C to illuminate the pixels corresponding with primary electrodes 101, 104C, 107C, and 110. During the second part of the time cycle, back plane lead 100B is activated along with primary leads 114A, 116D, and 120B to illuminate the pixels corresponding with primary electrodes 102A, 105D, and 108B. During the third part of the time cycle, back plane lead 100C is activated along with primary leads 114B, 116D, and 120A to illuminate the pixels corresponding with primary electrodes 103B, 106D, and 109A. The cycle is then repeated for as long as the particular display element is required. As can be appreciated from the foregoing, because each electrode pair is addressed for only approximately 1/3 of a complete time cycle, the contrast ratio will not be as great, on the average, as the contrast ratio of the 1/2 mux embodiment of FIGS. 1–4, however, a greater number of electrodes on the primary electrode plate can be addressed with the same number of leads. Although the illustrative embodiment of FIG. 5 has only 12 rows of electrodes, it should be readily apparent to those skilled in the art that additional rows of electrodes may be added by incorporating additional primary leads parallel to primary leads 116–116D and primary leads 120–120D.

FIG. 7 is a partial top view of a primary electrode plate 199 for use in an LCD display adapted to be driven at a 1/4 multiplex ratio. The illustrative electrode plate 199 comprises at least 16 rows (not all rows are shown) and at least 6 columns of electrodes. FIG. 8 is a top view of a corresponding back plane electrode plate 230.

Referring to FIG. 8, back plane electrodes 241, 241A, 241B, 241C and 241D are interconnected by bridges 231 to form a single row of interconnected back plane electrodes. Back plane electrodes 242-253D are similarly interconnected to form a plurality of single rows of interconnected back plane electrodes. Leads 300, 300A, 300B and 300C are alternatingly interconnected to every fourth row of interconnected back plane electrodes 241–253D. Primary electrode plate 199 is positioned above back plane electrode plate 230 with a liquid crystal material disposed between the two electrode plates as hereinbefore described, to form 80 electrode pairs 201-241, 201A-241A 201B-241B, 201C-241C, 201D-241D, 202-242, 202A-242A, etc. As with the 1/2 mux and 1/3 mux embodiments hereinbefore described, each electrode pair in the embodiment of FIGS. 7–8 is separately addressable during one complete time cycle, however, each complete time cycle consists of four distinct phases corresponding to activation of back plane leads 300, 300A, 300B and 300C, respectively. Although the illustrative embodiment of FIG. 7–8 has only 16 rows of electrodes, it should be readily apparent to those skilled in the art that additional rows of electrodes may be added by incorporating additional primary leads parallel to primary leads 116–116D and primary leads 120–120D.

In comparison to a conventional dot matrix LCD display, an LCD display constructed in accordance with the teachings of the present invention has a significantly increased RMS voltage differential to each pair of opposing stacked electrodes. The use of leads 40, 40A, 116, 116A, 216, 216A, etc. which extend between adjacent primary electrodes, the use of bridges 39, 39A, etc. to interconnect only a portion of the primary electrodes, and the simultaneous activation of two or more rows of back plane electrodes enables all of the electrode pairs required to produce an alphanumeric character or other character in an LCD display to be activated in only 2, 3 or 4 time cycles. The invention can also be utilized in configurations which activate all of the electrode pairs in five or more time cycles, but the reduction of the multiplex ratio in comparison to the prior art is normally not sufficient to warrant such configurations.

In FIGS. 1 to 8, each lead, bridge, and electrode extends only over and is on a face 13, 18. As would be appreciated by those of skill in the art, all or a portion of a lead, bridge, or electrode could, if desired, extend to, into, through, or over another portion of a plate 11 or 17 or could extend to, into, through, or over any other layer of material comprising an LCD assembly constructed in accordance with the invention.

The pitch or spacing between adjacent rows or columns can vary as desired as can the width of each row or column.

Although certain preferred embodiments and methods have been disclosed herein, it will be apparent from the foregoing disclosure to those skilled in the art that variations and modifications of such embodiments and methods may be made without departing from the true spirit and scope of the invention. Accordingly, it is intended that the invention shall be limited only to the extent required by the appended claims and the rules and principles of applicable law.

What is claimed is:

1. A passive dot matrix liquid crystal display assembly adapted to be driven at a multiplex ratio of 1/2 to 1/4, comprising:
   (a) a first electrode plate having a face and a back;
   (b) a second electrode plate having a face and a back, said face of said second plate being spaced apart from and opposed to said face of said first plate;
   (c) a layer of liquid crystal material intermediate said face of said first plate and said face of said second plate;
   (d) a plurality of spaced apart electrodes on the face of said second plate defining a matrix of back plane electrodes, said matrix comprising at least two columns and comprising a predetermined number of rows, said predetermined number of rows being greater than twice the inverse of said multiplex ratio;
   (e) a plurality of electrically conductive bridges interconnecting a plurality of said back plane electrodes to form a predetermined number of groups of interconnected back plane electrodes, said predetermined number of groups being equal to the inverse of said multiplex ratio;
   (f) a plurality of electrically conductive back plane leads, said electrically conductive back plane leads each being connected to one of said groups of interconnected back plane electrodes for applying a voltage thereto;
   (g) a plurality of spaced apart electrodes on the face of said first plate defining a matrix of main electrodes, said matrix comprising at least two columns and comprising a predetermined number of rows, said predetermined number of rows being greater than twice the inverse of said multiplex ratio, each of said main electrodes being spaced apart from and aligned with one of said back plane electrodes on said second plate;
   (h) a plurality of bridges on the face of said first plate, said plurality of bridges electrically interconnecting a plurality of said main electrodes to form a plurality of main electrode groups, wherein the number of main electrodes in each main electrode group is no greater than the inverse of said multiplex ratio;
   (i) a plurality of electrically conductive main leads on the face of said first plate, each of said main leads electrically connected to one of said plurality of main electrode groups.

2. The liquid crystal display of claim 1, wherein:
   said multiplex ratio is 1/2;
   said predetermined number of rows is greater than four;
   said predetermined number of groups of interconnected back plane electrodes is two; and
   the number of main electrodes in each main electrode group is no greater than two.

3. The liquid crystal display of claim 1, wherein:
   said multiplex ratio is 1/3;
   said predetermined number of rows is greater than six;
   said predetermined number of groups of interconnected back plane electrodes is three; and
   the number of main electrodes in each main electrode group is no greater than three.

4. The liquid crystal display of claim 1, wherein:
   said multiplex ratio is 1/4;
   said predetermined number of rows is greater than eight;
   said predetermined number of groups of interconnected back plane electrodes is four; and
   the number of main electrodes in each main electrode group is no greater than four.

5. A passive dot matrix liquid crystal display assembly, comprising:
   (a) a first electrode plate having a face and a back;
   (b) a plurality of spaced apart electrodes on the face of said plate defining at least one column of said electrodes, said column having a selected number of said electrodes;
   (c) a plurality of bridges on the face of said plate electrically interconnecting a predetermined number of said electrodes in said column, said predetermined number of said electrodes interconnected by each of said plurality of bridges being less than said selected number of said electrodes in said column;
   (d) a first electrically conductive column lead on the face of said plate and connected to one of said electrodes connected by one of said plurality of bridges;
   (e) a second electrically conductive column lead on the face of said plate and connected to an electrode in said first column other than said electrodes connected to said first electrically conductive column lead, said first and second electrically conductive column leads each comprising elongate leads having a width of no more than the subtend of 2 arc-seconds when viewed from a frame of reference normal to said first plate;
   (f) a second electrode plate having a face and a back, said face of said second plate being spaced apart from and opposed to said face of said first plate;
   (g) a layer of liquid crystal material intermediate said face of said first plate and said face of said second plate;
   (h) a plurality of spaced apart row electrodes on the face of said second plate, each of said row electrodes being spaced apart from and aligned with one of said electrodes in said column;
   (i) a plurality of electrically conductive row bridges on the face of said second plate interconnecting each of said row electrodes to an adjacent row electrode;
   (j) a plurality of electrically conductive row leads, said row electrodes, row bridges, and row leads disposed such that a projection of said column leads and column bridges onto said row bridges, row leads and row electrodes normal to the plane of said first and second plates defines a plurality of finite cross-over areas no greater than the subtend of two arc-seconds when viewed from a frame of reference normal to said first plate.

6. A passive dot matrix liquid crystal display assembly, comprising:
   (a) a first electrode plate having a face and a back;
   (b) a plurality of spaced apart electrodes on the face of said plate defining a matrix of main electrodes, said matrix comprising at least two columns and at least five rows of electrodes;
   (c) a plurality of bridges on the face of said plate each of said bridges electrically interconnecting only two of said main electrodes to form a plurality of electrode pairs;
   (d) a plurality of electrically conductive main leads on the face of said plate, each of said main leads electrically connected to one of said plurality of electrode pairs;

(e) a second electrode plate having a face and a back, said face of said second plate being spaced apart from and opposed to said face of said first plate;

(g) a layer of liquid crystal material intermediate said face of said first plate and said face of said second plate;

(h) a plurality of spaced apart electrodes on the face of said second plate defining a matrix of back plane electrodes, said matrix comprising at least two columns and at least five rows of said back plane electrodes, each of said back plane electrodes being spaced apart from and aligned with one of said main electrodes on said first plate;

(i) a first group of electrically conductive bridges on the face of said second plate interconnecting a first group of back plane electrodes;

(j) a second group of electrically conductive bridges on the face of said second plate interconnecting a second group of said back plane electrodes;

(k) first and second electrically conductive back plane leads, said first electrically conductive back plane lead being connected to said first group of back plane electrodes for applying a voltage to said first group of back plane electrodes independent from said second group of back plane electrodes, and said second electrically conductive back plane lead being connected to said second group of back plane electrodes for applying a voltage to said second group of back plane electrodes independent from said first group of back plane electrodes.

* * * * *